US008463077B1

(12) United States Patent
Weng et al.

(10) Patent No.: US 8,463,077 B1
(45) Date of Patent: Jun. 11, 2013

(54) ROTATION PHASE UNWRAPPING ALGORITHM FOR IMAGE RECONSTRUCTION

(75) Inventors: Jing-Feng Weng, Tainan (TW); Yu-Lung Lo, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/430,309

(22) Filed: Mar. 26, 2012

(51) Int. Cl.
*G06K 9/32* (2006.01)
*G06K 9/40* (2006.01)

(52) U.S. Cl.
USPC .......................................... 382/300; 382/275

(58) Field of Classification Search
None
See application file for complete search history.

(56) References Cited

U.S. PATENT DOCUMENTS

| | | | | |
|---|---|---|---|---|
| 5,608,405 | A * | 3/1997 | Pritt | 342/25 C |
| 6,208,416 | B1 * | 3/2001 | Huntley et al. | 356/606 |
| 6,438,272 | B1 * | 8/2002 | Huang et al. | 382/286 |
| 6,639,685 | B1 * | 10/2003 | Gu et al. | 356/603 |
| 7,605,925 | B1 * | 10/2009 | Chen | 356/511 |
| 2010/0150467 | A1 * | 6/2010 | Zhao et al. | 382/264 |

OTHER PUBLICATIONS

Huntley, J.M., Noise-immune phase unwrapping algorithm, 1989, Applied Optics, vol. 28, No. 15, pp. 3269-3270.*
Marklund, O., An Anistropic Evolution Formulation Applied in 2-D Unwrapping of Discontinuous Phase Surfaces, 2001, IEEE Transactions on Image Processing, vol. 10, No. 11, pp. 1700-1711.*
Qian, F., Wang, X., Wang, X., and Bu. Y., Adaptive filter for unwrapping noisy phase image in phase-stepping interferometry, 2001, Optics & Laser Technology, vol. 33, pp. 479-486.*
Abdelfattah, Riadh., InSAR phase analysis: Phase unwrapping for noisy SAR interferograms. 2009, Intech, ISBN 978-953-307-005-6, pp. 419-440.*
Langley, J.A., Brice, R.G., and Zhao, Q., Recursive approach to the moment-based phase unwrapping method, 2010, Applied Optics, vol. 49, No. 16, pp. 3096-3101.*
Liu, J. and Drangova, M., Phase-Unwrapping Algorithm for Translation Extraction From Spherical Navigator Echoes, 2010, Magnetic Resonance in Medicine, vol. 63, pp. 510-516.*
Xu, W., Chang, E.C., Kwoh, L.K., Lim, H., and Heng, W.C.A., Phase-unwrapping of SAR Interfereogram with Multi-frequency or Multi-baseline, 1994, Geoscience and Remote Sensing Symposium, vol. 2, pp. 730-732.*
Aebischer, Hubert A., et al., "A simple and effective method for filtering speckle-interferometric phase fringe patterns," Optics Communications, Apr. 15, 1999, pp. 205-210, vol. 162.
Capanni, Annalisa, et al., "Phase-shifting speckle interferometry: a noise reduction filter for phase unwrapping," Opt. Eng., 1997, pp. 2466-2472, vol. 36, No. 9.
Chang, H.Y., et al., "The Tapestry Cellular Automata phase unwrapping algorithm for interferogram analysis," Optics and Lasers in Engineering, 1998, pp. 487-502, vol. 30.
Dalmau-Cedeno, Oscar S., et al., "Fast phase recovery from a single closed-fringe pattern," Journal of Optical Society of America, Jun. 2008, pp. 1361-1370, vol. 25, No. 6.

(Continued)

*Primary Examiner* — Stephen R Koziol
*Assistant Examiner* — Jonathan S Lee
(74) *Attorney, Agent, or Firm* — Sughrue Mion, PLLC

(57) ABSTRACT

A method to generate an unwrapped phase map free from noise error, shifting error and hole error in image reconstruction. The method includes application of an unwrapping rotation phase unwrapping algorithm for obtaining image reconstruction.

14 Claims, 16 Drawing Sheets

OTHER PUBLICATIONS

Ghiglia, Dennis C., et al., "Cellular-automata method for phase unwrapping," Journal of Optical Society of America, Jan. 1987, pp. 267-280, vol. 4, No. 1.

Hooper, Andrew, et al., "Phase unwrapping in three dimensions with application to InSAR time series," Journal of Optical Society of America, Sep. 2007, vol. 24, No. 9.

Huang, M.J., et al., "Retrieving ESPI Map of Discontinuous Objects via a Novel Phase Unwrapping Algorithm," Strain, 2008, pp. 239-247, vol. 44, No. 3.

Kim, Eun-Hee, et al., "Profilometry without phase unwrapping using multi-frequency and four-step phase-shift sinusoidal fringe projection," Optics Express, May 11, 2009, pp. 7818-7830, vol. 17, No. 10.

Liu, Kai, et al., "Dual-frequency pattern scheme for high-speed 3-D shape measurement," Optics Express, Mar. 1, 2010, pp. 5229-5244, vol. 18, No. 5.

Macy Jr., William, W., "Two-dimensional fringe-pattern analysis," Applied Optics, Dec. 1, 1983, vol. 22, No. 23.

Marendic, Boris, et al., "Phase unwrapping using an extrapolation-projection algorithm," Journal of Optical Society of America, Aug. 2006, pp. 1846-1855, vol. 23, No. 8.

Mehta, Dalip Singh, et al., "Simple multifrequency and phase-shifting fringe-projection system based on two-wavelength lateral shearing interferometry for three-dimensional profilometry," Applied Optics, Dec. 10, 2005, pp. 7515-7521, vol. 44, No. 35.

Moon, Inkyu, et al., "Three-dimensional speckle-noise reduction by using coherent integral imaging," Optics Letters, Apr. 15, 2009, pp. 1246-1248, vol. 34, No. 8.

Potuluri, P., et al., "High depth of field microscopic imaging using an interferometric camera," Optics Express, May 21, 2001, pp. 624-630, vol. 8, No. 11.

Pouet, Bruno, F., "Technique for the removal of speckle phase in electronic speckle interferometry," Optics Letters, Feb. 1, 1995, pp. 318-320, vol. 20, No. 3.

Su, Wei-Hung, et al., "A large-depth-of-field projected fringe profilometry using supercontinuum light illumination," Optics Express, Feb. 7, 2005, pp. 1025-1032, vol. 13, No. 3.

Wada, Atsushi, et al., "Large step-height measurements using multiple-wavelength holographic interferometry with tunable laser diodes," Journal of Society of America, Dec. 2008, pp. 3013-3020, vol. 25, No. 12.

Weng, Jing-Feng, et al., "Robust detection scheme on noise and phase jump for phase maps of objects with height discontinuities—theory and experiment," Optics Express, Feb. 14, 2011, pp. 3086-3105, vol. 19, No. 4.

Weng, Jing-Feng, et al., "Integration of robust filters and phase unwrapping algorithms for image reconstruction of objects containing height discontinuities," Optical Society of America, 2011.

Yamaki, Ryo, et al., "Singularity-Spreading Phase Unwrapping," IEEE Transactions on Geoscience and Remote Sensing, Oct. 2007, pp. 3240-3251, vol. 45, No. 10.

Yuqing, Shi, "Robust phase unwrapping by spinning iteration," Optics Express, Jun. 25, 2007, pp. 8059-8064, vol. 15, No. 13.

Zhang, Song, et al., "Multilevel quality-guided phase unwrapping algorithm for real-time three-dimensional shape reconstruction," Applied Optics, Jan. 1, 2007, pp. 50-57, vol. 46, No. 1.

* cited by examiner

ROTATION PHASE UNWRAPPING ALGORITHM FOR IMAGE RECONSTRUCTION

FIELD

Exemplary embodiments relate to image reconstruction, and, more particularly, to a rotation phase unwrapping algorithm for obtaining successful image reconstruction of objects.

BACKGROUND

Image reconstruction is a related art technique that encompasses the entire image formation process and provides a foundation for the subsequent steps of image processing. The goal is to retrieve image information that has been lost in the process of image formation. In optical interference imaging techniques, interferograms of an object are generally converted into a wrapped phase map containing phase values in the range 0~2π using a phase-shift algorithm. Three types of noise (residual noise, speckle noise, and noise at the lateral surface of height discontinuities) influence image reconstruction. Speckle noise is usually generated due to the laser source. Residual noise is the noise induced by environmental effects or contamination of the optical system. The depth of field limit and the diffraction limit influence the optical measurement range, especially for microscope interferometers. For the object containing height discontinuities, the interferograms of the object will blur when the height of the object is out of the depth of field. Therefore, the blur of the interferograms at the height discontinuities will be converted into noise in the wrapped phase map.

The wrapped phase maps are unwrapped by phase unwrapping algorithms. The phase unwrapping algorithms are classified as temporal, spatial and period-coding. Furthermore, the spatial phase unwrapping algorithms are classified as path-dependent algorithms (for example, MACY algorithm) and path-independent algorithms (for example, CA (cellular automata) algorithm). In these phase unwrapping algorithms, the noise problems in the process of image reconstruction generate error, known as the noise error. Various filtering algorithms are used to remove the noise error. The 2π phase jumps are smeared by filtering algorithms and produce an error known as the shifting error. The shape of holes present in objects also influences the image reconstruction and produce an error known as the hole error.

Most of the phase unwrapping algorithms are based on the shifting 2π method and are designed complexly in order to be efficient only for the phase values and therefore, the noise error, the shifting error and the hole error still exist.

Thus, there is an unmet need for generating a successful image reconstruction free from the noise error, the shifting error and the hole error.

SUMMARY

Aspects of the exemplary embodiments relate to a rotation phase unwrapping algorithm applicable in image reconstruction.

It is an object of the exemplary embodiments to generate an unwrapped phase map free from noise error, shifting error and hole error.

It is still another object of the exemplary embodiments to provide a method for generating an unwrapped phase map, wherein the method comprises generating interferograms of an object image, generating a wrapped phase map of the object image from the interferograms by application of a phase-shift algorithm, and detecting phase jumps and noise in the wrapped phase map. The method further comprises receiving a first phase jump position, a second phase jump position, a third phase jump position and a fourth phase jump position, all corresponding to one of a column and a row of the wrapped phase map, classifying a first phase value comprising phase values, the noise and holes at the left of a second phase jump position, and classifying a second phase value comprising phase values, the noise and holes between a third phase jump position and a fourth phase jump position, and calculating a first row center from the first phase and a second row center from the second phase. Additionally, the method comprises interpolating a first phase center of the first row center position based on the first row center position and neighboring integral row pixels thereof, interpolating a second phase center of the second row center position based on the second row center position and neighboring integral row pixels thereof, and generating a third phase by performing a first relative rotation for the first phase around the first phase center by a first angle so as to preserve the phase values, the noise and holes of the first phase, and generating a fourth phase by performing the first relative rotation for the second phase around the second phase center by a second angle to preserve the phase values, the noise and holes of the second phase. The method also comprises generating a fifth phase by performing a second relative rotation of the third phase around the first phase center by a third angle with a position of the fourth phase is not changed, generating a resultant phase by shifting the fifth phase and performing a stitching process in which a sixth phase is generated by stitching the resultant phase and the fourth phase; wherein the sixth phase is free from phase jumps between the first phase jump position and the fourth phase jump position, and repeating the first relative rotation, the second relative rotation and the stitching process to obtain a seventh phase corresponding to one of a column (or a row) of the two-dimensional phase map. The sixth phase of the present cycle is the first phase of the next cycle, and the seventh phase is free from phase jumps corresponding to the row or the column of the two-dimensional phase map. The method also comprises generating a first three-dimensional unwrapped phase map by performing a first absolute rotation of the seventh phases corresponding to the columns or the rows of the two-dimensional phase map, and generating a second three-dimensional unwrapped phase map by performing a second absolute rotation of phases obtained corresponding to the seventh phases after application of the first absolute rotation. The second three-dimensional unwrapped phase map has a prescribed phase distribution and is free from noise error, shifting error and hole error, wherein the second three-dimensional unwrapped phase map having a prescribed phase distribution that can be inspected at a human vision scale.

It is still another object of the exemplary embodiments to generate an unwrapped phase map having a prescribed phase distribution by filtering the preserved noise from the unwrapped phase map.

DETAILED DESCRIPTION

Disclosed herein is a rotation phase unwrapping method that will aid in generating an unwrapped phase map free from noise error, shifting error and hole error in image reconstruction. Numerous specific details are provided such as examples of components and/or mechanisms to provide a thorough understanding of the various exemplary embodiments. One skilled in the relevant art will recognize however, that an exemplary embodiment can be practiced without one or more of the specific details, or with other apparatus, systems, assemblies, methods, components, materials, parts, and/or the like. In other instances, well-known structures, materials or operations are not specifically shown or described in detail to avoid obscuring aspects of exemplary embodiments and for the sake of clarity.

Figure 1:
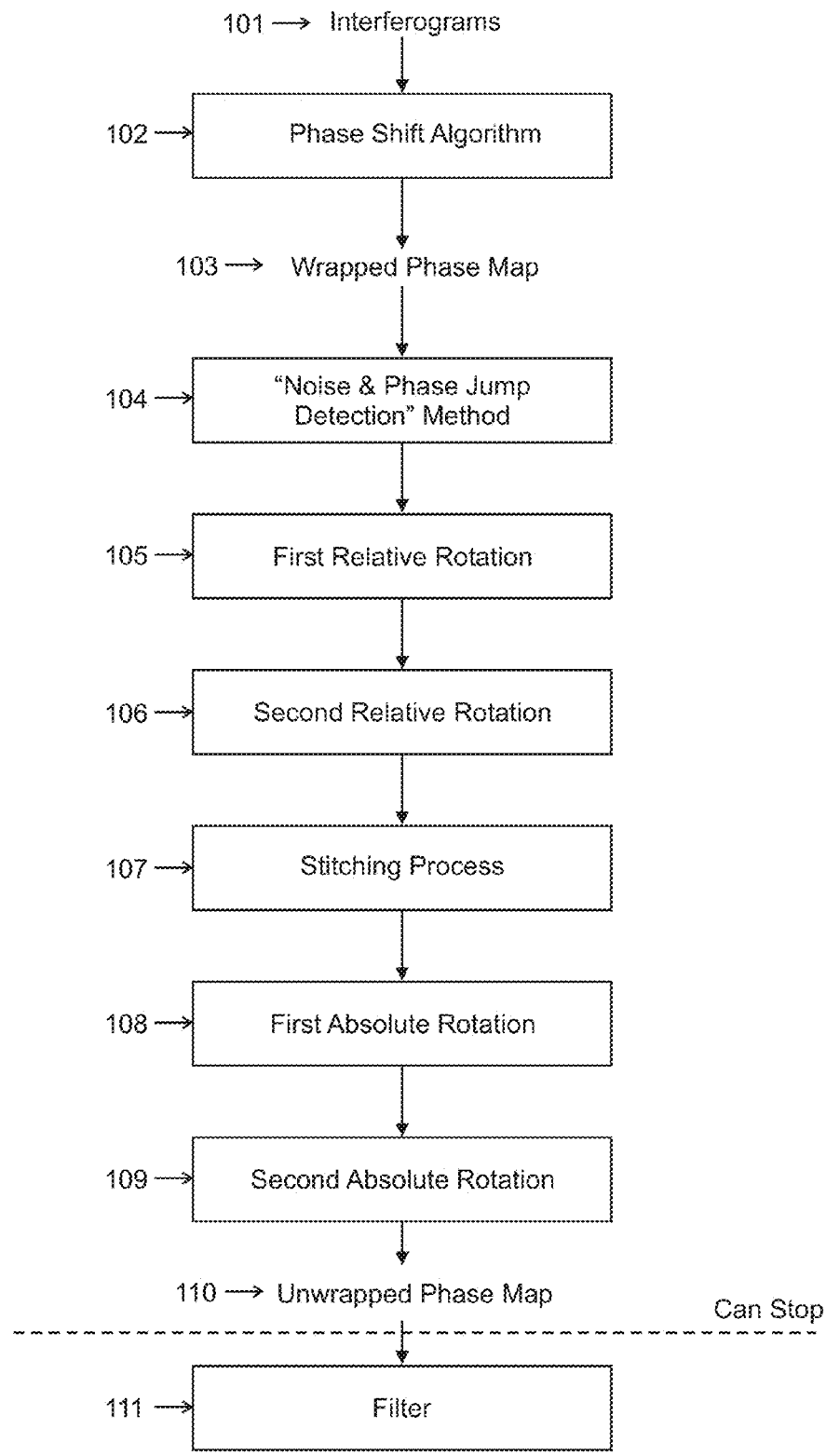
FIG. 1 illustrates a flow chart for image reconstruction in accordance with an exemplary embodiment.

FIG. 1 illustrates a flow chart for image reconstruction in accordance with an exemplary embodiment. The flowchart includes interferograms 101, a phase-shift algorithm 102, a wrapped phase map 103, a "noise and phase jump detection" method 104, a first relative rotation 105, a second relative rotation 106, a stitching process 107, a first absolute rotation 108, a second absolute rotation 109, an unwrapped phase map 110 and a filter 111.

The interferograms 101 of an object image are converted into the wrapped phase map 103 containing phase values in the range 0~2π by the phase-shift algorithm 102.

In an exemplary embodiment, the phase-shift algorithm 102 is a five-frame phase-shift algorithm. However, other algorithms may be substituted therefor, as would be understood by those skilled in the art, such as (but not limited to) three-frame phase-shift algorithm, four-frame phase-shift algorithm, Carre' algorithm and other phase-shifting algorithms.

The wrapped phase map 103 contains residual noise and noise at the lateral surface of height discontinuities and holes. The "noise and phase jump detection" method 104 detects residual noise, noise at the lateral surface of height discontinuities and phase jumps from the wrapped phase map 103. Subsequently, the first relative rotation 105, the second relative rotation 106, the stitching process 107, the first absolute rotation 108 and the second absolute rotation 109 are applied in order to generate the unwrapped phase map 110 free from the noise error, the shifting error and the hole error. All these processes and the function of the filter 111 have been explained in detail below.

The relative rotation process includes three steps: the first relative rotation 105, the second relative rotation 106, and the stitching process 107. Rotation algorithm of the present inventive concept includes the relative rotation process, the first absolute rotation 108 and the second absolute rotation 109.

Figure 2A:
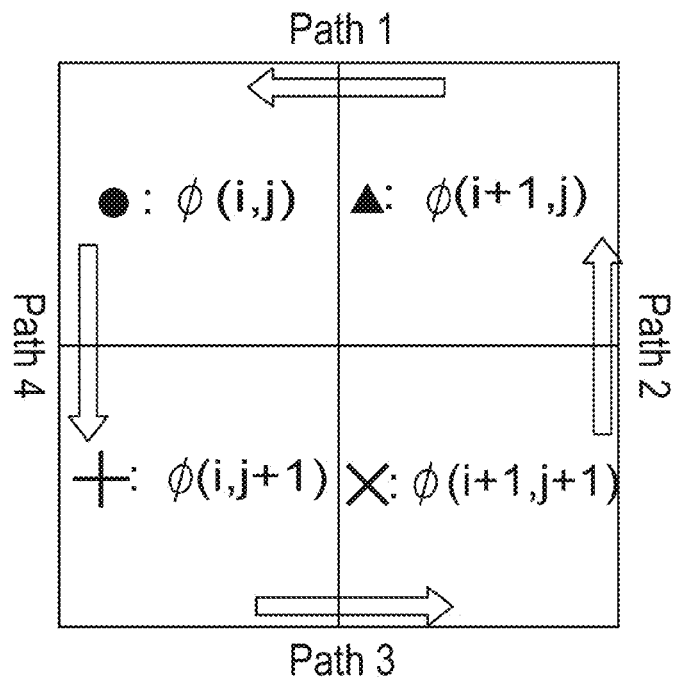
FIG. 2(a) is a graph showing the top view of four neighboring pixels of the wrapped phase map containing residual noise and lateral surface noise at the points of height discontinuities.
Figure 2B:
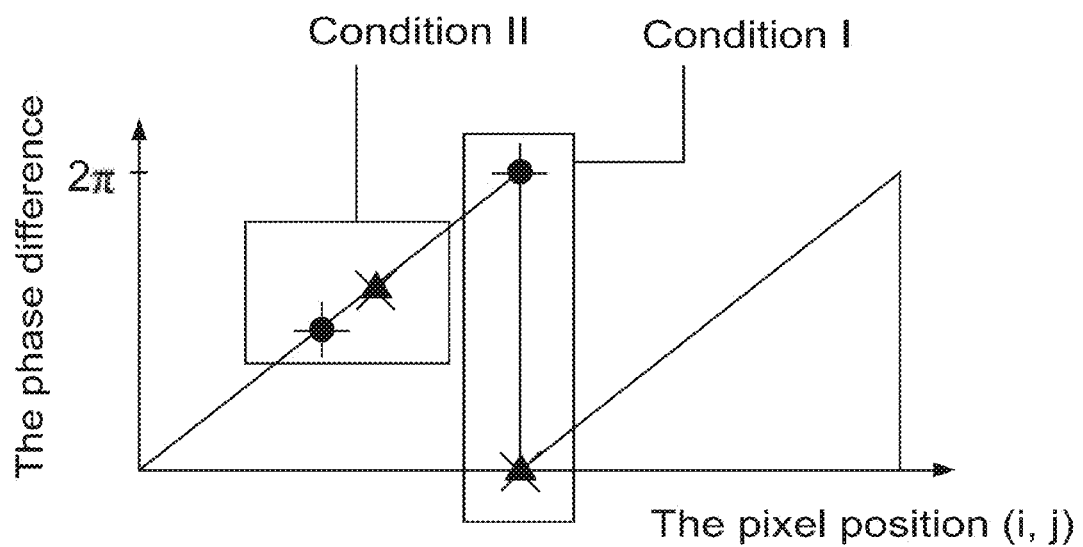
FIG. 2(b) is a graph showing the frontal view of three-dimensional (3D) wrapped phase map containing residual noise and lateral surface noise at the points of height discontinuities.

FIG. 2(a) shows the top view of four neighboring pixels of the wrapped phase map 103. Symbols ●, ▲, ×, and + indicate the phase values of corresponding pixels. FIG. 2(b) shows a frontal view of the three-dimensional (3D) wrapped phase map 103.

The noise and phase detection method as disclosed in the present invention has four forms (i.e. comparative phase parameters):

$$S1(i, j) = \left[\frac{\phi(i+1, j) - \phi(i, j) - \sigma_A}{2\pi}\right] + \left[\frac{\phi(i+1, j+1) - \phi(i+1, j) + \sigma_A}{2\pi}\right] + \left[\frac{\phi(i, j+1) - \phi(i+1, j+1) - \sigma_A}{2\pi}\right] + \left[\frac{\phi(i, j) - \phi(i, j+1) + \sigma_A}{2\pi}\right] \quad (1)$$

$$S2(i, j) = \left[\frac{\phi(i+1, j) - \phi(i, j) + \sigma_A}{2\pi}\right] + \left[\frac{\phi(i+1, j+1) - \phi(i+1, j) - \sigma_A}{2\pi}\right] + \left[\frac{\phi(i, j+1) - \phi(i+1, j+1) + \sigma_A}{2\pi}\right] + \left[\frac{\phi(i, j) - \phi(i, j+1) - \sigma_A}{2\pi}\right]$$

$$S3(i, j) = \left[\frac{\phi(i+1, j) - \phi(i, j) + \sigma_A}{2\pi}\right] + \left[\frac{\phi(i+1, j+1) - \phi(i+1, j) + \sigma_A}{2\pi}\right] + \left[\frac{\phi(i, j+1) - \phi(i+1, j+1) - \sigma_A}{2\pi}\right] +$$

$$S4(i, j) = \left[\frac{\phi(i, j+1) - \phi(i+1, j+1) - \sigma_A}{2\pi}\right] +$$
$$\left[\frac{\phi(i, j) - \phi(i, j+1) - \sigma_A}{2\pi}\right]$$
$$\left[\frac{\phi(i+1, j) - \phi(i, j) - \sigma_A}{2\pi}\right] +$$
$$\left[\frac{\phi(i+1, j+1) - \phi(i+1, j) - \sigma_A}{2\pi}\right] +$$
$$\left[\frac{\phi(i, j+1) - \phi(i+1, j+1) + \sigma_A}{2\pi}\right] +$$
$$\left[\frac{\phi(i, j) - \phi(i, j+1) + \sigma_A}{2\pi}\right]$$

Where (i,j) is the pixel position; Φ is the corresponding phase value in the wrapped phase map 103; the brackets [ ] indicate a rounding operation; and $\sigma_A$ is the "noise and phase jump detection" threshold parameter. The parameter S1 in Eq. (1) uses four terms to calculate the phase difference between two neighboring pixels. The first term, i.e.

$$\left[\frac{\phi(i+1, j) - \phi(i, j) - \sigma_A}{2\pi}\right],$$

is defined as Path 1, the second term, i.e.

$$\left[\frac{\phi(i+1, j+1) - \phi(i+1, j) + \sigma_A}{2\pi}\right]$$

is defined as Path 2. Similarly, $$\left[\frac{\phi(i, j+1) - \phi(i+1, j+1) - \sigma_A}{2\pi}\right]$$

is defined as Path 3, while $$\left[\frac{\phi(i, j) - \phi(i, j+1) + \sigma_A}{2\pi}\right]$$

is defined as Path 4. As shown in FIG. 2(*a*), each path is composed of the phase difference between two neighboring pixels and Paths 1, 2, 3 and 4 of S1 are defined in the counterclockwise direction. Similarly, Paths 1, 2, 3 and 4 in parameters S2~S4 in Eq. (1) are also defined in the counterclockwise direction. As shown in FIG. 2(*b*), the region of the phase difference map, close to the 2π phase jumps is defined as Condition I, while that away from the phase jumps is defined as Condition II. The particular characteristics of the two regions are mentioned in the following sub-sections. It is shown that the pixels in both conditions can be treated as continuous (i.e. non-noisy) provided that the condition S1=S2=S3=S4=0 in Eq. (1) holds.

Characteristics of Condition I pixels: The ideal case in which the phase values of four neighboring pixels in the phase jump region of the wrapped phase map 103 are Φ(i,j)=2π, Φ(i+1,j)=0, Φ(i,j+1)=2π, and Φ(i+1,j+1)=0, respectively is considered. Substituting these values into Eq. (1) gives $$S1(i, j) = \left[\frac{0 - 2\pi - \sigma_A}{2\pi}\right] + \left[\frac{0 - 0 + \sigma_A}{2\pi}\right] + \quad (2)$$
$$\left[\frac{2\pi - 0 - \sigma_A}{2\pi}\right] + \left[\frac{2\pi - 2\pi + \sigma_A}{2\pi}\right]$$
$$= 1 + \left[\frac{-\sigma_A}{2\pi}\right] + \left[\frac{\sigma_A}{2\pi}\right] + 1 + \left[\frac{-\sigma_A}{2\pi}\right] + \left[\frac{\sigma_A}{2\pi}\right]$$
$$= 0$$

As shown in Eq. (2), the sum of the four terms in S1 is equal to zero. Similarly, the sums of the four terms in S2, S3 and S4, respectively, are also equal to zero, i.e. S2(i,j)=S3(i,j)=S4(i,j)=0. Furthermore, the zero result obtained in Eq. (2) holds for any value of the threshold parameter $\sigma_A$. Thus, it follows that the performance of the "noise and phase jump detection" method 104 is insensitive to the value of $\sigma_A$ when applied to the pixels in the Condition I regions of the wrapped phase map 103. In addition to the ideal case of Φ(i,j)=2π, Φ(i+1,j)=0, Φ(i,j+1)=2π, and Φ(i+1,j+1)=0, the four neighboring pixels in the phase jump region of the wrapped phase map 103 may also have one phase value equal to 2π and three phase values equal to zero, or one phase value equal to zero and three phase values equal to 2π. However, in every case, the result S1(i,j)=S2(i,j)=S3(i,j)=S4(i,j)=0 is obtained. Therefore, pixels Φ(i,j), Φ(i+1,j), Φ(i,j+1), and Φ(i+1,j+1) in the region of the 2π phase jump are treated as continuous phase value pixels (i.e. non-noisy pixels).

Characteristics of Condition II pixels: The four neighboring pixels shown in as shown in FIG. 2(*a*) are treated as continuous pixels if their phase values i.e. Φ(i,j), Φ(i+1,j), Φ(i,j+1), and Φ(i+1,j+1) are sufficiently close. That is, given the condition $0 \leq \sigma_A < \pi$, each of the four terms in S1, S2, S3 and S4 in Eq. (1) is equal to zero, i.e.

$$S1(i, j) = \left[\frac{\phi(i+1, j) - \phi(i, j) - \sigma_A}{2\pi}\right] = \left[\frac{\phi(i+1, j+1) - \phi(i+1, j) + \sigma_A}{2\pi}\right] \quad (3)$$
$$= \left[\frac{\phi(i, j+1) - \phi(i+1, j+1) - \sigma_A}{2\pi}\right] = \left[\frac{\phi(i, j) - \phi(i, j+1) + \sigma_A}{2\pi}\right]$$
$$= 0 (= S2(i, j) = S3(i, j) = S4(i, j))$$

The four terms in Eq. (3) are different from those in Eq. (2). Specifically, the four phase values in Eq. (3) are sufficiently close as to be continuous, while those in Eq. (2) are equal to either 0 or 2π. The detection method treats the pixel (i,j) as noisy pixel if any one of S1, S2, S3 or S4 has a value other than zero. PD denotes the phase difference between any two neighboring continuous pixels at any position in the 2×2 area. In other words, PD=Φ(i+1,j)−Φ(i,j), Φ(i+1,j+1)−Φ(i+1,j), Φ(i,j+1)−Φ(i+1,j+1), or Φ(i,j)−Φ(i,j+1).

As a result, Eq. (3) can be further expressed as $$\left[\frac{PD - \sigma_A}{2\pi}\right] = \left[\frac{PD + \sigma_A}{2\pi}\right] = 0 \quad (4)$$

From Eq. (4), $$\frac{PD - \sigma_A}{2\pi} < \pm 0.5 \quad (5)$$

and $$\frac{PD + \sigma_A}{2\pi} < \pm 0.5 \quad (6)$$

Assuming that the condition $0 \leq \sigma_A < \pi$ holds, the intersection of Eqs. (5) and (6) yields $$|PD| < \pi - \sigma_A \quad (7)$$

Where $\pi - \sigma_A$ is the absolute maximum phase difference in the whole wrapped phase map 103.

In accordance with Eq. (7), if the absolute phase difference (|PD|) between any two neighboring pixels is less than $\pi - \sigma_A$, the "noise and phase jump detection" method 104 yields S1(i,j)=S2(i,j)=S3(i,j)=S4(i,j)=0, and pixel (i,j) is defined as a "good pixel". Conversely, if the absolute phase difference of any two neighboring pixels falls outside the range $\pi - \sigma_A$, more than one of S1, S2, S3 or S4 is not equal to zero, and thus pixel (i,j) is defined as a "bad pixel".

In summary, the "noise and phase jump detection" method 104 given in Eq. (1) enables the $2\pi$ phase jump in the Condition I region of the wrapped phase map 103 to be retained irrespective of the value assigned to the threshold parameter $\sigma_A$, and treats the Condition II region of the wrapped phase map 103 as a continuous region if |PD| satisfies the constraint given in Eq. (7). The "noise and phase jump detection" 104 method in Eq. (1) is applied to express two maps, namely the "noise map" and the "phase jump map". The "noise map" illustrates the noise positions where one of S1-S4 is not zero, and the "phase jump map" illustrates the positions where more than one path in S1 (or S2-S4) is not equal to zero and the sum of four paths in S1 (or S2-S4) is zero. The phase jump map marks all phase jump positions. The threshold parameter, $\sigma_A$, is decided from Eq. (7), where the value of $\pi - \sigma_A$ is specified in accordance with the spatial resolution of the wrapped phase map 103.

In an exemplary embodiment, as shown in FIG. 2(b) only shows the straight phase regarding to the specific geometric shape. However, other cases, such as the curved or arbitrary phase can also be considered without departing from the scope of the present inventive concept.

Simulation results: The "noise and phase jump detection" method 104 described by Eq. (1) detects the residual noise, the noise at the lateral surfaces of the height discontinuities and phase jumps from the wrapped phase map 103.

Figure 3:
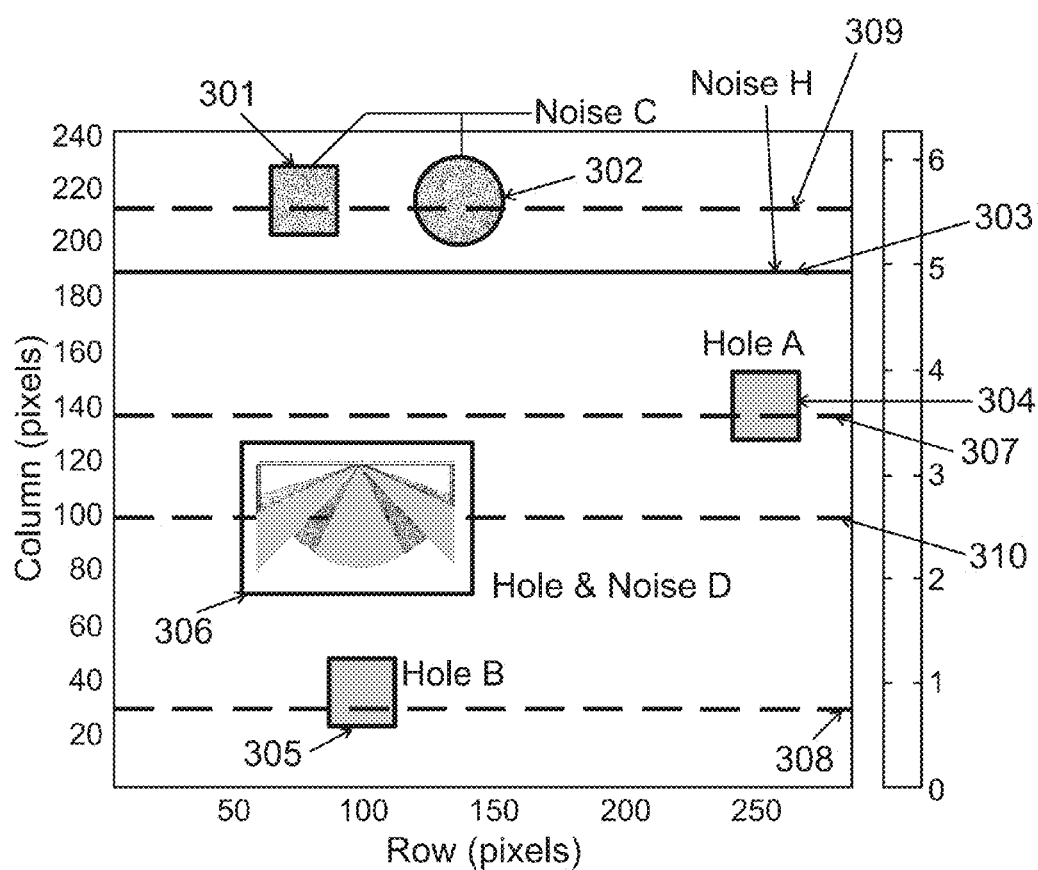
FIG. 3 is a graph showing the wrapped phase map containing residual noise, lateral surface noise at the points of height discontinuities, Hole A, Hole B and "Hole & Noise D".

FIG. 3 shows the wrapped phase map 103 containing residual noise (marked as "Noise C" within the square 301 and circular region 302), lateral surface noise at the points of height discontinuities (marked as "Noise H" along the line 303), Hole A (within the square 304), Hole B (within the square 305) and "Hole & Noise D" (within the rectangle 306). Hole A is far from the position of phase jumps, but Hole B straddles the position of high and low phase jumps. The phase values within each of the Hole A and Hole B are equal to zero. Depth of Hole A is very deep, but depth of Hole B is very shallow. The practical value of the depth of holes is between the depth values of Hole A and Hole B. "Hole & Noise D" is a special geometric graph which is composed of the holes and the noise, and it represents any geometric shape or defect on the surface of the sample (for which image reconstruction has to be achieved). Four corresponding cross sections of Hole A, Hole B, Noise C and "Hole & Noise D" are marked as dashed lines denoted by 307, 308, 309 and 310, respectively in the wrapped phase map 103.

Figure 4A:
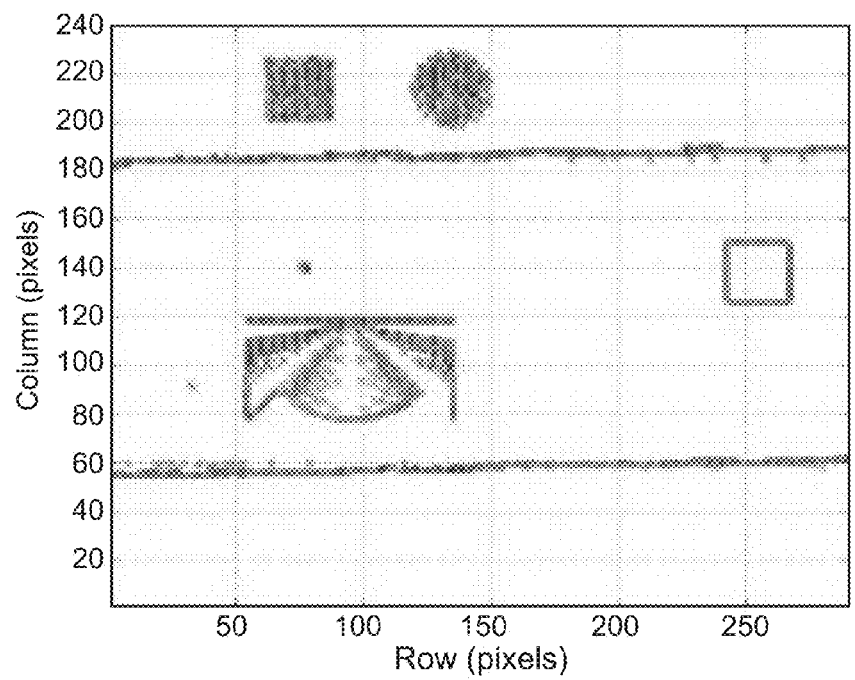
FIG. 4(a) is a graph showing the noise map obtained after application of the "noise and phase detection" method to the wrapped phase map.
Figure 4B:
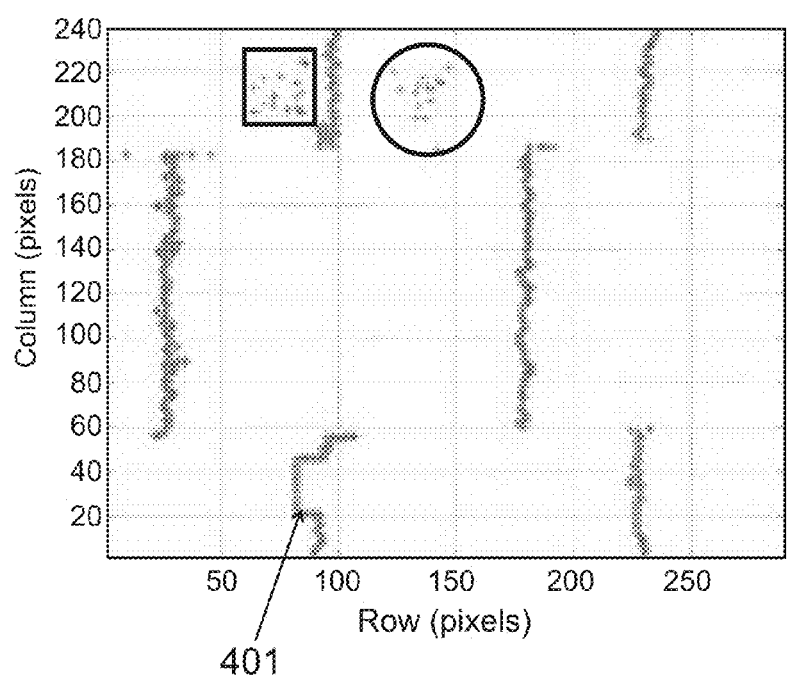
FIG. 4(b) is a graph showing the phase map obtained after application of the "noise and phase detection" method to the wrapped phase map.

FIG. 4(a) and FIG. 4(b) illustrate the "noise map" and the "phase jump map" respectively, obtained after application of the "noise and phase detection" method 104 with $\sigma_A$=2.4 to the wrapped phase map 103. As shown in FIG. 4(a), the distribution of "Hole & Noise D" containing the hole and the noise is very clear in the noise map and is detected successfully in the noise map. The lateral surface noise at the points of height discontinuities and "Hole A" are also detected successfully in the noise map. The detection errors in the two marked regions of the phase jump map are moved into the noise map because the detection error of Noise C causes the rotation algorithm to fail. The "half square of Hole B" 401 as shown in FIG. 4(b) detected at the straddling position of one phase jump line is able to detect the highest $2\pi$ phase jumps.

The phase jump map marks all phase jump positions of the wrapped phase map 103. In the present inventive concept, four phase jump positions: a first phase jump position $D_1$, a second phase jump position $D_2$, a third phase jump position $D_3$ and a fourth phase jump position $D_4$ (as shown in FIG. 5) are considered to start the relative rotation process.

Figure 5:
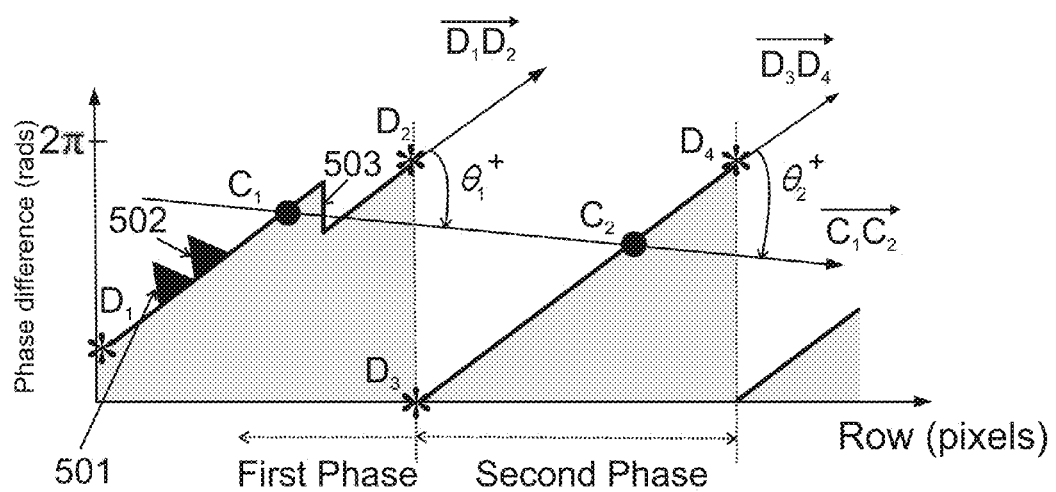
FIG. 5 is a graph showing the wrapped phases (the first phase and the second phase) in two-dimensional (2D) coordinates (phase difference vs. row).

FIG. 5 shows the wrapped phases in two-dimensional (2D) coordinates (phase difference vs. row). A first phase (denoted by curve $D_1C_1D_2$ in FIG. 5) represents the "phase values, noise and holes at the left of the second phase jump position ($D_2$)" and a second phase (denoted by curve $D_3C_2D_4$ in FIG. 5) represents "phase values, noise and holes between the third phase jump position ($D_3$) and the fourth phase jump position ($D_4$)". Triangles 501 and 502 represent the noise or holes (or both) between $D_1$ and $D_2$.

From $D_1$ to $D_2$, the phase values, the noise and the holes are used to determine a row center and a corresponding phase center, which are expressed by Eq. (8) and Eq. (9) respectively.

$$\text{row\_center}(n, 1) = \frac{\sum_{t=D1}^{D2} \text{phase}(i, 1) * i}{\sum_{t=D1}^{D2} \text{phase}(i, 1)} \quad (8)$$

where the parameter n denotes the number of the phase centers, row_center(n,1) denotes each row center position. i(=D1 to D2) denotes the row position between D1 to D2. The term phase(i,1) denotes value of phase and/or noise between D1 to D2.

In the Eq. (8), Since phase(i,1), i=D1 to D2 contains the phase values, holes and noise from the positions $D_1$ to $D_2$ thus, the phase value, holes and the noise will be preserved simultaneously by Eq. (8).

From Eq. (8), the row center is obtained and the corresponding phase center is determined using Eq. (9).

phase_center(n,1)=interpolation with row_center(i,1)
and two neighboring integral row pixels  (9)

Where, phase_center(n,1) denotes the corresponding phase value of each row center, which is determined by using the interpolation with the row center and two neighboring integral row pixels.

As shown in FIG. 5, the phase center between $D_1$ and $D_2$ (a first phase center) is denoted by $C_1$ and the phase center between $D_3$ and $D_4$ (a second phase center) is denoted by $C_2$;

and one of the height discontinuities between $C_1$ and $D_2$ is denoted by 503. Triangles 501 & 502 and the height discontinuity 503 will change the directions of the vectors $\overline{D_1D_2}$, $\overline{D_3D_4}$ and $\overline{C_1C_2}$.

The steps of the first relative rotation 105 are as follows:
1. Determination of the two phase centers $C_1$ and $C_2$: Eqs. (8) and (9) are used to determine the first phase center $C_1$ between $D_1$ to $D_2$. Similarly the second phase center $C_2$ between $D_3$ to $D_4$ is determined.
2. Determination of the vectors $\overline{D_1D_2}$, $\overline{D_3D_4}$, and $\overline{C_1C_2}$: $D_1$, $D_2$, $D_3$, $D_4$, $C_1$, and $C_2$ are used to determine vectors $\overline{D_1D_2}$, $\overline{D_3D_4}$ and $\overline{C_1C_2}$ (as shown in FIG. 5)
3. Determination of angle between the two vectors $\overline{D_1D_2}$ and $\overline{D_3D_4}$ (i.e. $\theta_{fix}$): The angle between the two vectors $\overline{D_1D_2}$ and $\overline{D_3D_4}$ (i.e. $\theta_{fix}$) is determined and used in the second relative rotation 106 which has been described in detail later in the description.

The two vectors, $\overline{D_1D_2}$ and $\overline{D_3D_4}$ have an angle $\theta_{fix}$ before the first relative rotation 105 starts. After the completion of the first relative rotation 105 and the second relative rotation 106, the corresponding angle $\theta_{fix}$ between the two corresponding vectors has the same value.

Figure 6:
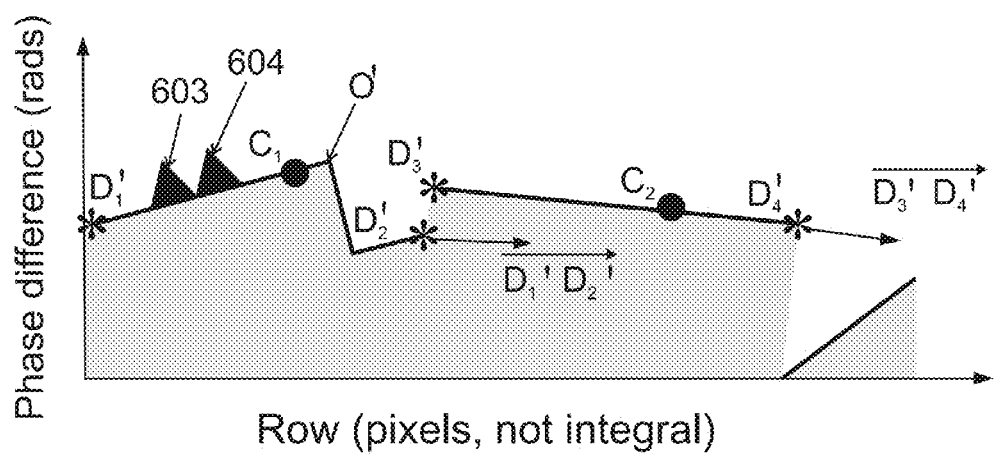
FIG. 6 is a graph showing the result of first relative rotation.

4. Determination of a first angle $\theta_1$ from $\overline{D_1D_2}$ and $\overline{C_1C_2}$, and a second angle $\theta_2$ from $\overline{D_3D_4}$ and $\overline{C_1C_2}$: As shown in FIG. 5, the first angle $\theta_1$ is obtained from the two vectors $\overline{D_1D_2}$ and $\overline{C_1C_2}$ and the second angle $\theta_2$ is obtained from the two vectors $\overline{C_1C_2}$ and $\overline{D_3D_4}$.
5. Rotation of the second phase by the second angle $\theta_2$, and rotation of the first phase by the first angle $\theta_1$: As shown in FIG. 5, a fourth phase is generated by rotating the second phase by the second angle $\theta_2$ with the rotating center as the second phase center $C_2$ and the rotating direction taken clockwise towards the vector $\overline{C_1C_2}$. Similarly, a third phase is generated by rotating the first phase by the first angle $\theta_1$ with the rotating center as the first phase center $C_1$ and the rotating direction taken clockwise towards the vector $\overline{C_1C_2}$. The clockwise rotating direction is defined as positive, represented as $\theta_1^+$ and $\theta_2^+$, as illustrated in FIG. 5. The second phase is rotated first since the second angle $\theta_2$ is always clockwise. According to the rotated result of the second angle $\theta_2$, the first phase is then rotated by the first angle $\theta_1$ clockwise or counterclockwise.
6. Completion of the first relative rotation 105 (saving the phase values, noise and holes): FIG. 6 shows the completed first relative rotation 105.

The first relative rotation 105 is finished when the first phase and the second phase are rotated by the first angle $\theta_1$ and the second angle $\theta_2$, respectively. After rotating by the second angle $\theta_2$, the second phase moves from the positions of $D_3$ and $D_4$ (as shown in FIG. 5) to $D_3'$ and $D_4'$ as shown in FIG. 6. After rotating by the first angle $\theta_1$, the first phase moves from the positions of $D_1$ and $D_2$ to $D_1'$ and $D_2'$ as shown in FIG. 6. At the completion of the first relative rotation 105, "the noise and/or holes" (denoted by the triangles 603 & 604) and the phase values are preserved in the first phase and the second phase.

The first relative rotation 105 may cause incorrect rotating results. If the two wrapped phases (the first phase and the second phase) are straight lines, then the first relative rotation 105 is finished by following the steps 1 to 4. The height discontinuity (503 in FIG. 5), the "noise and/or holes" (triangles 501 and 502 in FIG. 5) in more than one of the two wrapped phases (such as the first phase in FIG. 5) cause the directions of the vectors $\overline{D_1D_2}$, $\overline{D_3D_4}$, and $\overline{C_1C_2}$ to be changed, thus, resulting in incorrect rotating results of the first phase and the second phase.

Figure 7:
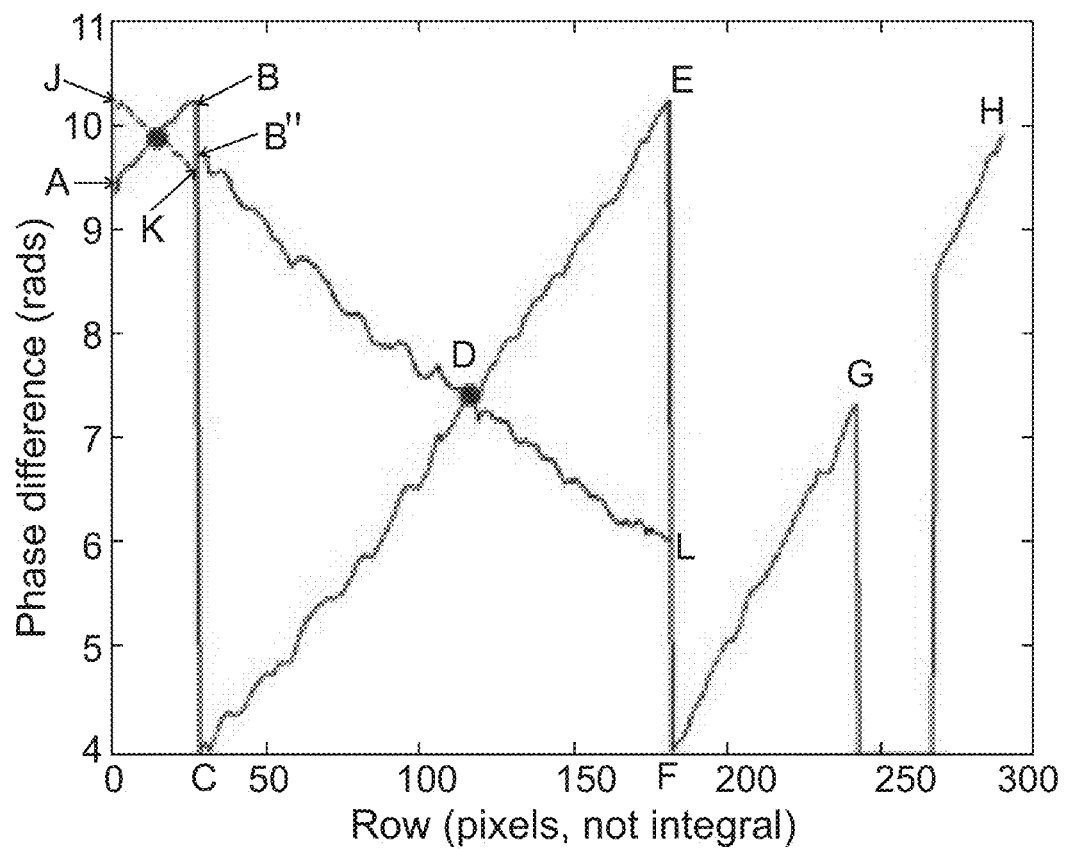
FIG. 7 is a graph showing the simulation result for the first relative rotation.

FIG. 7 shows the simulation result for step 1 to 6 of the first relative rotation 105 with the cross section line 307 crossing Hole A with the position from (1, 135) to (290, 135) (row, column) as shown in FIG. 3. In FIG. 7, three wrapped phases are denoted by AB, CE and FH, so the relative rotation process is performed twice. JK and B"L represent the third phase and the fourth phase respectively after the completion of the first relative rotation 105.

Figure 8:
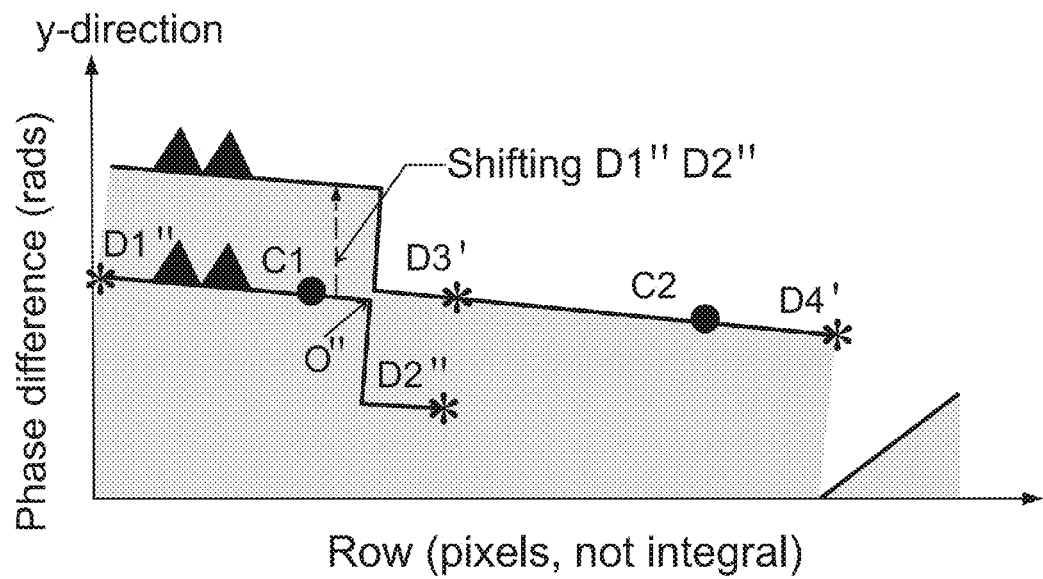
FIG. 8 is a graph showing the result of the second relative rotation.

The purpose of the second relative rotation 106 is to obtain correct rotating results for the first phase and the second phase. The steps of the second relative rotation 106 are as follows:
1. Determination of the angle between the two vectors $\overline{D_1'D_2'}$ and $\overline{D_3'D_4'}$ (i.e. $\theta'_{fix}$): The two vectors $\overline{D_1'D_2'}$ and $\overline{D_3'D_4'}$ (as shown in FIG. 6) are determined from $D_1'$, $D_2'$, $D_3'$, and $D_4'$ and then the angle $\theta'_{fix}$ between two vectors $\overline{D_1'D_2'}$ and $\overline{D_3'D_4'}$ is determined. In FIG. 5 and FIG. 6 the positions of the phase centers $C_1$ and $C_2$ are unchanged since the positions of $C_1$ and $C_2$ are fixed for the first relative rotation 105. Therefore, the vector $\overline{C_1C_2}$ remains unchanged.
2. Rotation of the third phase by a third angle $\sigma''_{fix}$ with rotating center as the first phase center $C_1$:

The angle $\theta_{fix}$ is determined from the step 3 of the first relative rotation 105. The angles $\theta_{fix}$ and $\theta'_{fix}$ are used to determine the third angle $\theta''_{fix}$. The three angles $\theta_{fix}$, $\theta'_{fix}$, and the third angle $\theta''_{fix}$ are based on the unchanged vector $\overline{C_1C_2}$, and the relation is as follows. The angle $\theta_{fix}$ and the angle between two vectors $\overline{D_1'D_2'}$ and $\overline{D_3'D_4'}$ i.e. $\theta'_{fix}$ are used to determine the third angle $\theta''_{fix}$. If $\overline{D_1D_2}$ is higher than $\overline{D_3D_4}$ at $D_2'$, the equation is $\theta''_{fix}=\theta'_{fix}-\theta_{fix}$. If $\overline{D_1D_2}$ is lower or equal than $\overline{D_3D_4}$ at $D_2'$, the equation is $\theta''_{fix}=\theta_{fix}-\theta'_{fix}$. Finally, the fourth phase is fixed and the third phase is rotated by the third angle $\theta''_{fix}$ with the rotating center as the first phase center $C_1$. The third phase from $D_1'$ to $D_2'$ as shown in FIG. 6 denoted by $D_1'O'D_2'$ is rotated by the third angle $\theta''_{fix}$ and the obtained phase, i.e. the fifth phase is denoted by $D_1''O''D_2''$ as shown in FIG. 8. The fourth phase from $D_3'$ to $D_4'$ as shown in FIG. 6 remains unchanged as shown in FIG. 8. When the second relative rotation 106 is completed, the required rotating results are correct.

Figure 9:
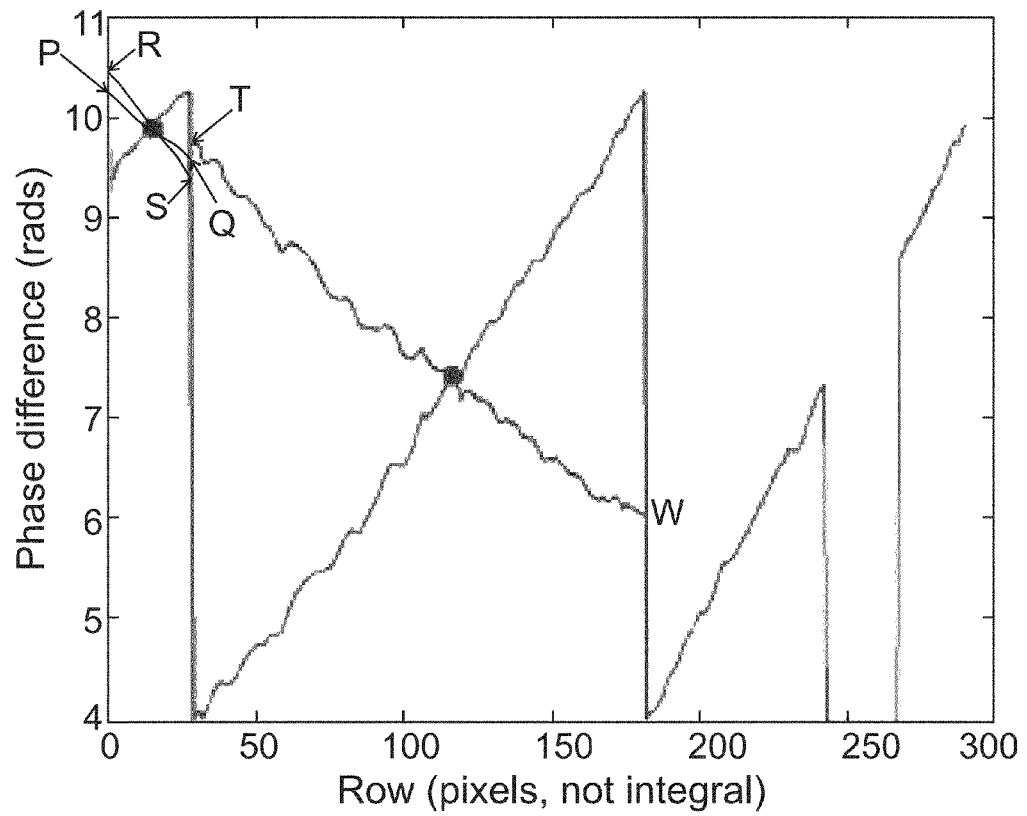
FIG. 9 is a graph showing the simulation result for the second relative rotation.

FIG. 9 shows the simulation result for the second relative rotation 106 with the cross section line 307 crossing Hole A with the position from (1, 135) to (290, 135) (row, column) as shown in FIG. 3. In the FIG. 9, PQ is the third phase of the first relative rotation 105 and RS is the fifth phase obtained from the second relative rotation 106. TW is the fourth phase (as shown in FIG. 9) which is same as B"L (as shown in FIG. 7) obtained from the first relative rotation 105.

Figure 10:
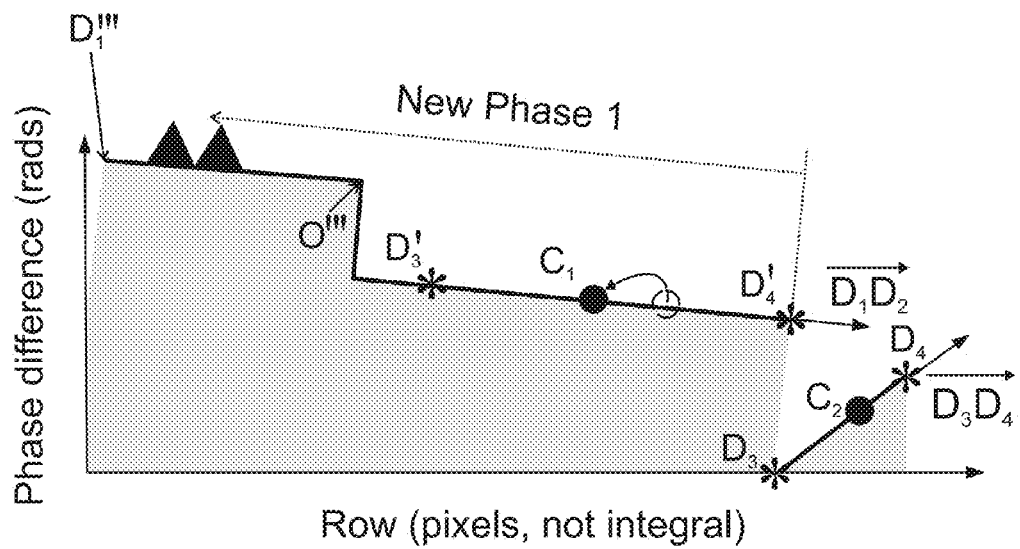
FIG. 10 is a graph showing the result of the stitching process.

The steps for the stitching process 107 are as follows:
1. Shifting the fifth phase in y-direction (i.e. the vertical direction) to stitch with the fourth phase: As shown in FIG. 8, the fifth phase (denoted by $D_1''O''D_2''$) is shifted in y-direction and the resultant phase is stitched with the fourth phase (denoted by $D_3'D_4'$); after stitching, $D_2''$ and $D_3'$ are coincident.
2. Completion of the stitching process 107 and commencement of the new first relative rotation:

The stitching process 107 is completed when a sixth phase (denoted by $D_1'''O'''D_3'D_4'$) is generated by shifting the fifth phase (denoted by $D_1''O''D_2''$) in y-direction and stitching the resultant phase (denoted by $D_1'''O'''D_3'$) with the fourth phase (denoted by $D_3'D_4'$) as shown in FIG. 10. The cycles of the relative rotation process (i.e. the first relative rotation 105, the second relative rotation 106 and the stitching process 107) are repeated, with the sixth phase of the present cycle of the relative rotation process being considered as the first phase of the next cycle of the relative rotation process to obtain a seventh phase corresponding to each column (or row) of two-dimensional phase map obtained from application of the cycles. The obtained seventh phase corresponding to each column (or row) is free from all phase jumps which exist in that particular column (or row).

Figure 11:
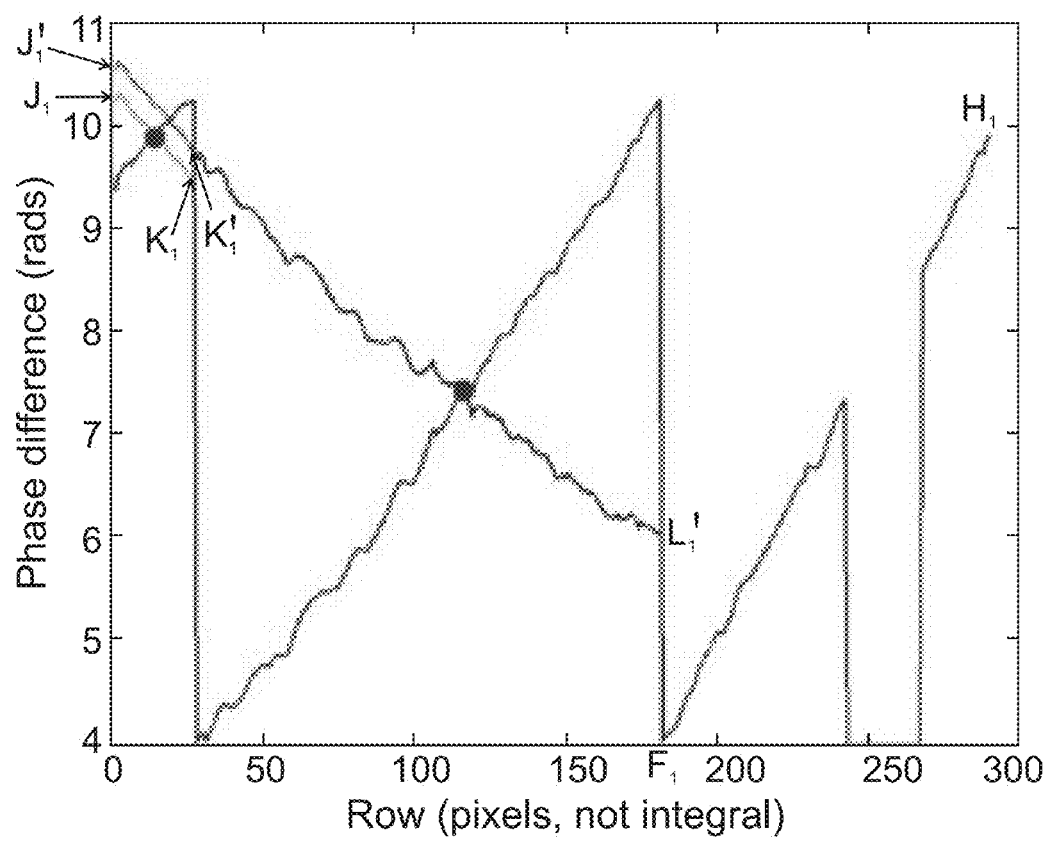
FIG. 11 is a graph showing the simulation result for the stitching process.

FIG. 11 shows the simulation result for the stitching process 107 with the cross section line 307 crossing the Hole A with the position from (1, 135) to (290, 135) (row, column) as shown in FIG. 3. In FIG. 11, $J_1K_1$ is the fifth phase obtained from the second relative rotation 106. $K_1'L_1'$ is the fourth phase obtained from the second relative rotation 106 (as shown in FIG. 11) which is same as B"L (as shown in FIG. 7) obtained from the first relative rotation 105 (since, the fourth phase obtained from the first relative rotation 105 is unchanged during the second relative rotation 106). The sixth phase is generated by shifting the fifth phase $J_1K_1$ in the vertical direction and then stitching the resultant phase $J_1'K_1'$ with the fourth phase $K_1'L_1'$.

Figure 12A:
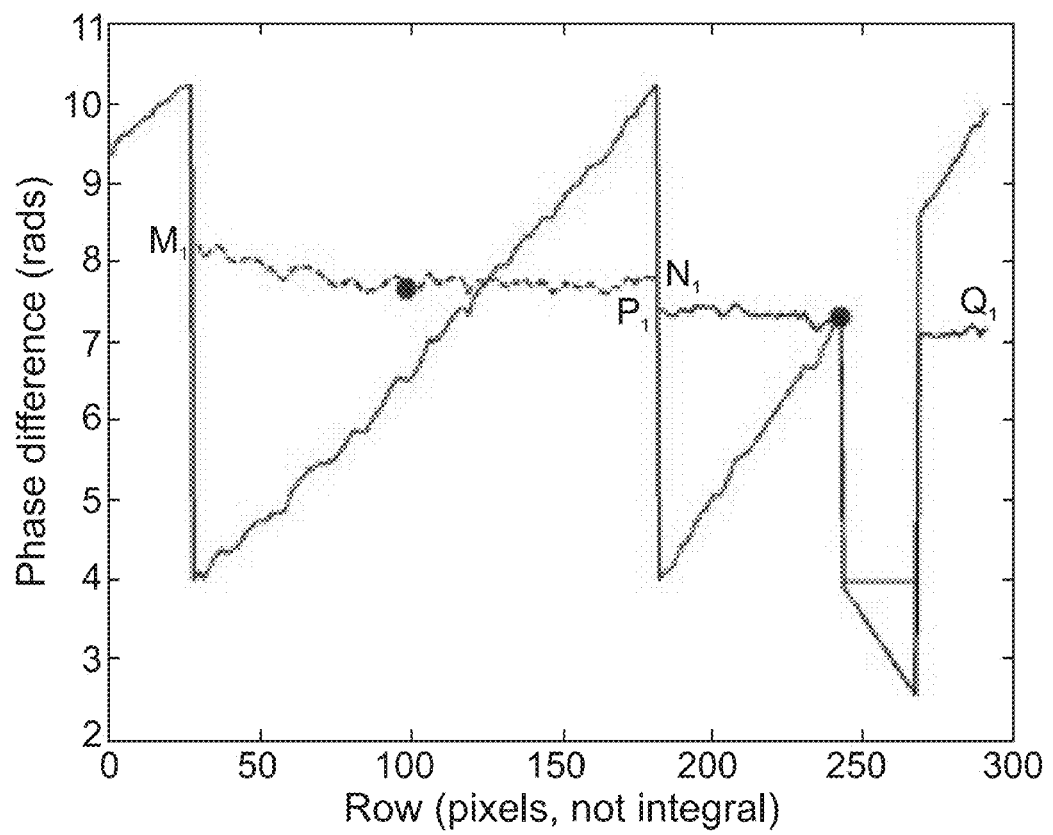
FIG. 12(a) is a graph showing the simulation result for the first relative rotation of the cycle of the relative rotation process considering Hole A of the wrapped phase map.
Figure 12B:
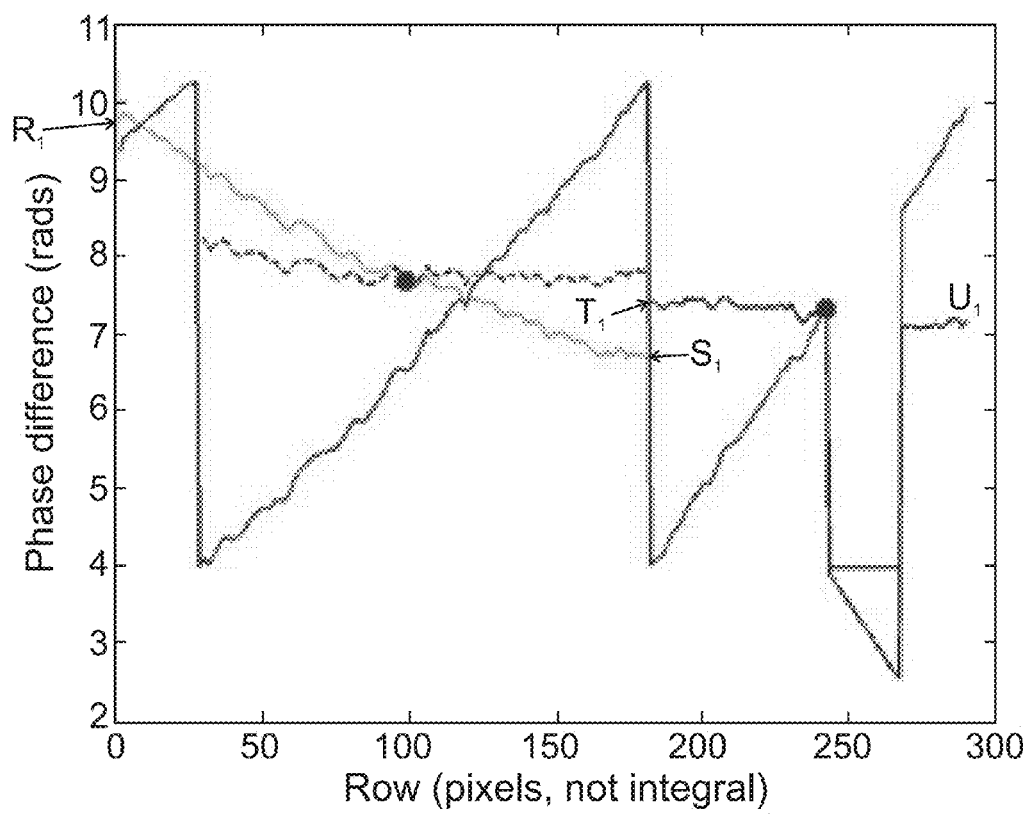
FIG. 12(b) is a graph showing the simulation result for the second relative rotation of the cycle of the relative rotation process considering Hole A of the wrapped phase map.
Figure 12C:
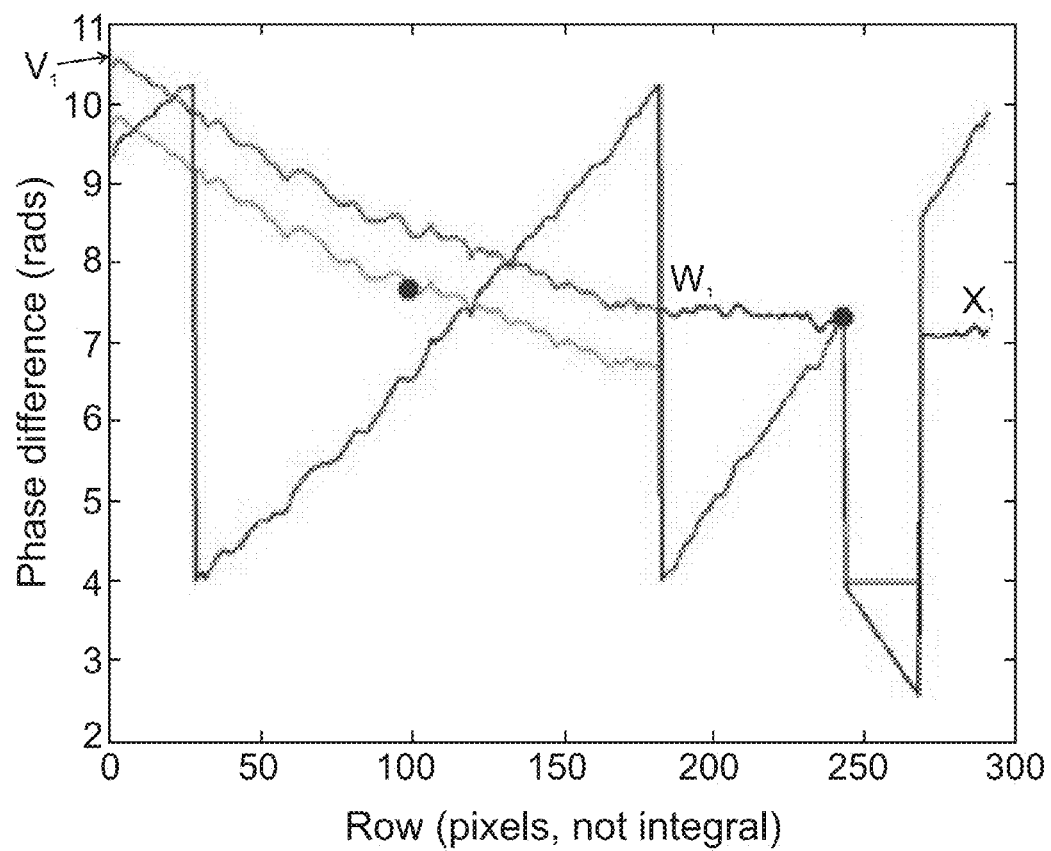
FIG. 12(c) is a graph showing the simulation result for the stitching process of the cycle of the relative rotation process considering Hole A of the wrapped phase map.

FIG. 12 shows the simulation results for the cycle of the relative rotation process with the cross section line 307 crossing the Hole A with the position from (1, 135) to (290, 135) (row, column) as shown in FIG. 3. FIG. 12(a) shows the simulation result for the first relative rotation 105 of the cycle of the relative rotation process. $M_1N_1$ is the third phase and $P_1Q_1$ is the fourth phase obtained from the first relative rotation. FIG. 12(b) shows the simulation result for the second relative rotation 106 of the cycle of the relative rotation process. $R_1S_1$ is the fifth phase obtained from the second relative rotation 106, $T_1U_1$ is the fourth phase which remains unchanged during the second relative rotation 106 which is same as $P_1Q_1$ (as shown in FIG. 12(a)) obtained from the first relative rotation 105 of the cycle of the relative rotation process. FIG. 12(c) shows the simulation result for the stitching process 107 of the cycle of the relative rotation process. $W_1X_1$ is the fourth phase (as shown in FIG. 12(c)) which is same as fourth phase $T_1U_1$ (as shown in FIG. 12(b)). The fifth phase $R_1S_1$ (as shown in FIG. 12(b)) is shifted in y-direction and the resultant phase is stitched with the fourth phase $W_1X_1$. From FIG. 12(c) it is evident that the Hole A is saved by the relative rotation. Now, $V_1W_1X_1$, i.e. the sixth phase becomes the new first phase for the subsequent cycle of the relative rotation process.

The relative rotation is for 2-dimensional image reconstruction and the absolute rotation is for 3-dimensional image reconstruction. The absolute rotation process includes two steps: a first absolute rotation 108, and a second absolute rotation 109. The purpose of the first absolute rotation 108 is to generate a 3-dimensional unwrapped phase map by transforming all the seventh phases (obtained by repeating the cycles of the relative rotation process) from 2-dimensional coordinates to the corresponding 3-dimensional coordinates. The second absolute rotation 109 generates a 3-dimensional unwrapped phase map which has a prescribed (e.g., good) phase distribution.

Figure 13A:
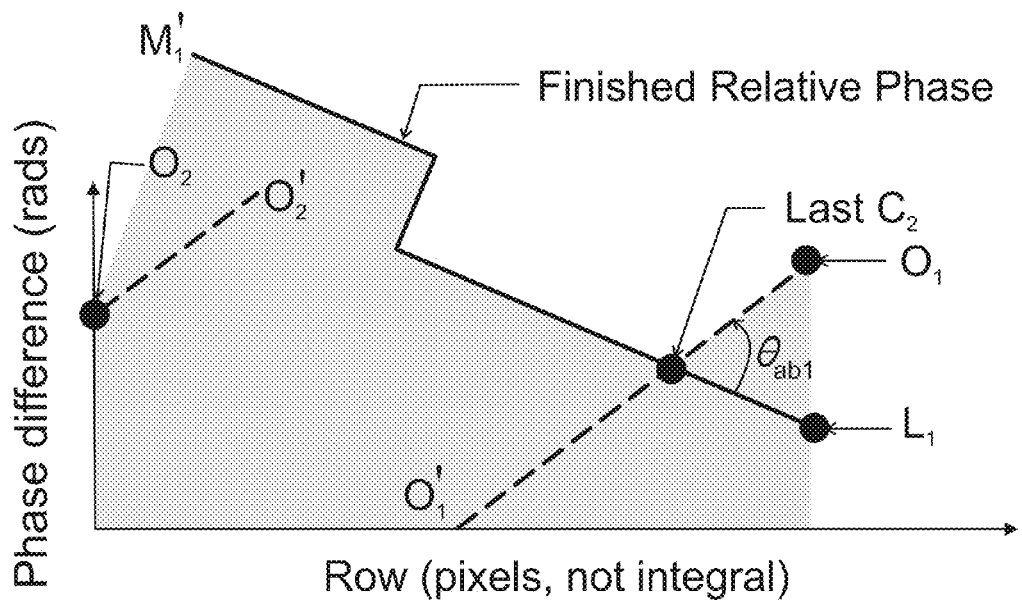
FIG. 13(a) is a graph showing the seventh phase (result of the cycles of the relative rotation process).
Figure 13B:
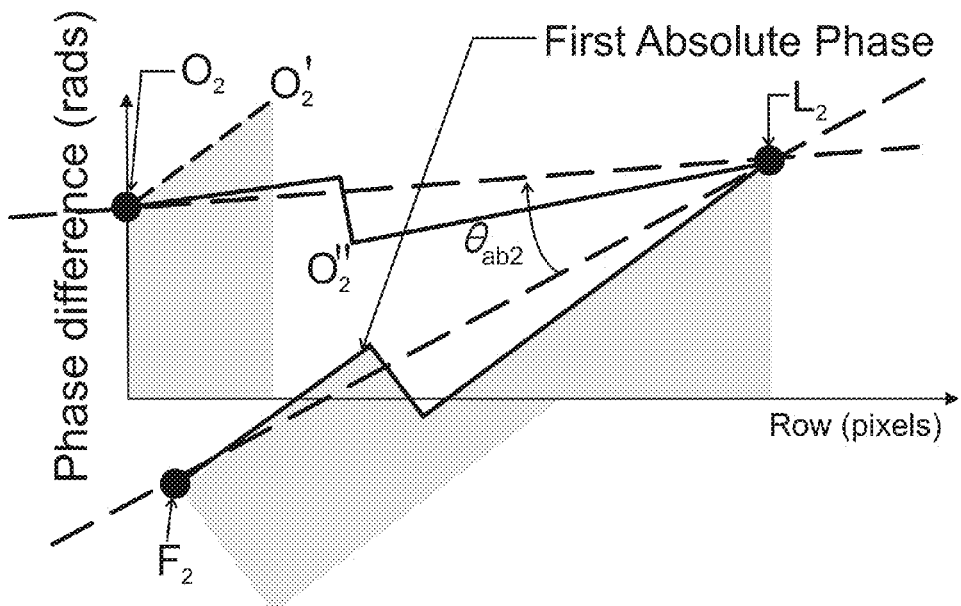
FIG. 13(b) is a graph showing the results of the first absolute rotation and the second absolute rotation.

The procedure for the first absolute rotation 108 is as follows: As shown in FIG. 13(a), after the completion of the cycles of the relative rotation process, the (seventh phase) $M_1'L_1$ is obtained. The seventh phase $M_1'L_1$ is the unwrapped phase since it is free from all $2\pi$ phase jumps. $M_1'$ is the first position and $L_1$ is the last position in the seventh phase. $O_2O_2'$ and $O_1'O_1$ represent the first and last phase jumps in the wrapped phase, respectively. In each 2D coordinate (that, is each column (or row)), $O_1$ is the last position at the last phase jump and $O_2$ is the first position at the first phase jump corresponding to each column (or row) of the two-dimensional phase map obtained from application of the cycles of the relative rotation process. From the cycle of the relative rotation process, "Last C2" is the same position as the last phase center of the seventh phase $M_1'L_1$. $\theta_{ab1}$ is the angle between the seventh phase $M_1'L_1$ and the last phase jump $O_1'O_1$. The seventh phase $M_1'L_1$ is rotated by the angle $\theta_{ab1}$ from $L_1$ to $O_1$ with the phase center "Last $C_2$" taken as the rotating center. The rotating result is the first absolute phase $F_2L_2$ as shown in FIG. 13(b) and this completes the first absolute rotation 108.

Since one 3-dimensional coordinate (row×column×phase difference) is composed of many 2-dimensional coordinates (row×phase difference), in the 3-dimensional wrapped phase map (row×column×phase difference), all of the corresponding positions of $O_1$ in the column direction enable all of the seventh phases in 2-dimensional coordinates (row×phase difference) to transform into 3-dimensional coordinates, thus, generating a first three-dimensional unwrapped phase map.

The procedure for the second absolute rotation 109 is as follows: In FIG. 13(b), $L_2$ is the last position and $F_2$ is the first position of the first absolute phase $F_2L_2$. In the second absolute rotation 109, three points $O_2$, $L_2$ and $F_2$ compose two vectors $\overline{L_2O_2}$ and $\overline{L_2F_2}$. Angle between the two vectors $\overline{L_2O_2}$ and $\overline{L_2F_2}$ is $\theta_{ab2}$. All the first absolute phases are rotated by the angle $\theta_{ab2}$ from $F_2$ to $O_2$ with $L_2$ taken as the rotating center. The rotation result is $O_2L_2$ and this completes the second absolute rotation 109. After the completion of the second absolute rotation 109, the unwrapped phase map 110 is obtained which is free from noise error, shifting error and hole error but contains the noise preserved during the first relative rotation 105. The unwrapped phase map 110 has a prescribed (e.g., good) phase distribution (and can be inspected at a human vision range, e.g., by user's eyes).

The filter 111 is used to remove the preserved noise from the unwrapped phase map 110, which may contain residual noise or noise at lateral surface of height discontinuities or combination thereof. Since the prescribed phase distribution can be inspected at a human visual range, e.g., by user's eyes easily, use of the filter 111 is optional.

Figure 14A:
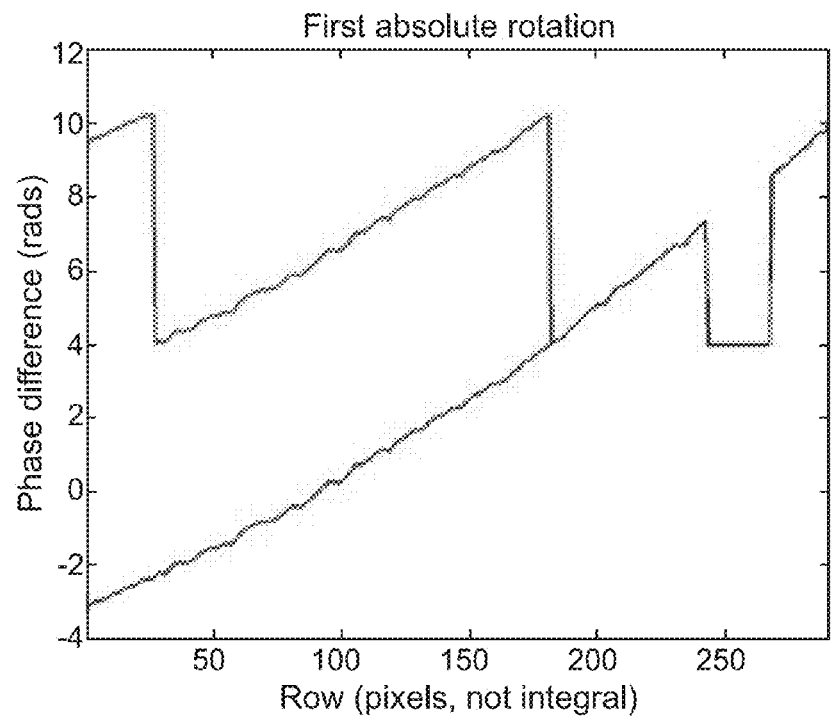
FIG. 14(a) is a graph showing the simulation result for the first absolute rotation.
Figure 14B:
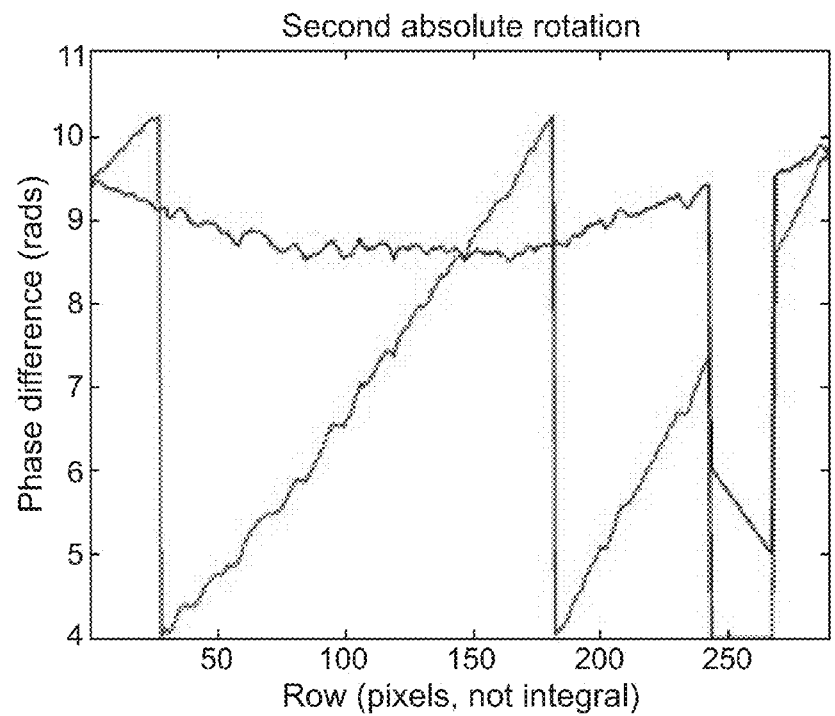
FIG. 14(b) is a graph showing the simulation result for the second absolute rotation.

FIG. 14(a) and FIG. 14(b) show the simulation results for the first absolute rotation 108 and second absolute rotation 109 respectively with the cross section line 307 crossing the Hole A with the position from (1, 135) to (290, 135) (row, column) as shown in FIG. 3. From an inspection of FIGS. 14(a) and 14(b), it is evident that the Hole A is saved, successful image reconstruction is achieved and the result of the second absolute rotation 109 has a smoother and prescribed (e.g., good) phase distribution.

Similarly, simulation results (not shown here) corresponding to Hole B, Noise C and "Noise & Hole D" justify the objective of "successful image reconstruction" of the proposed inventive concept.

The whole process for image reconstruction as shown has been described in detail taking the wrapped phase map 103 as two-dimensional. However, without departing from the scope of the present inventive concept, this whole process can also be applied to three-dimensional wrapped phase map to obtain successful image reconstruction.

The simulations of the proposed method have been performed using MATLAB software on a PC equipped with an AMD Athlon™ 64×2 4400+2.31 GHz dual-core processor and 2 GB of RAM. The five simulated interferograms of height discontinuities have been produced using MATLAB software and then converted into a single raw wrapped phase map with dimensions of 294×246 pixels (rows×columns).

While the exemplary embodiments have been disclosed for illustrative purposes, those skilled in the art will appreciate that various modifications and other embodiments are possible, without departing from the scope and spirit of the present inventive concept as defined by the appended claims.

We claim:
1. A method for generating an unwrapped phase map, wherein the method comprises:
   generating interferograms of an object image;
   generating a wrapped phase map of the object image from the interferograms by application of a phase-shift algorithm;
   detecting phase jumps and noise in the wrapped phase map;
   considering a first phase jump position, a second phase jump position, a third phase jump position and a fourth phase jump position, all corresponding to one of a column (or a row) of the wrapped phase map;
   classifying a first phase value of a first phase comprising phase values, the noise and holes at the left of the second phase jump position, and classifying a second phase value of a second phase comprising phase values, the noise and holes between the third phase jump position and the fourth phase jump position;
   calculating a first row center from the first phase and a second row center from the second phase;
   interpolating a first phase center of the first row center position based on the first row center position and neighboring integral row pixels thereof;
   interpolating a second phase center of the second row center position based on the second row center position and neighboring integral row pixels thereof;
   generating a third phase by performing a first relative rotation of the first phase around the first phase center by a first angle so as to preserve the phase values, the noise and holes of the first phase, and generating a fourth phase by performing the first relative rotation of the second phase around the second phase center by a second angle to preserve the phase values, the noise and holes of the second phase;
   generating a fifth phase by performing a second relative rotation of the third phase around the first phase center by a third angle without changing a position of the fourth phase;
   generating a resultant phase by shifting the fifth phase and performing a stitching process in which a sixth phase is generated by stitching the resultant phase and the fourth phase;
   wherein the sixth phase is free from phase jumps between the first phase jump position and the fourth phase jump position;
   repeating cycles of the first relative rotation, the second relative rotation and the stitching process to obtain a seventh phase corresponding to one of a column (or a row) of the two-dimensional phase map obtained from application of the cycles;
   wherein the sixth phase of present said cycle is said first phase of next said cycle;
   wherein the seventh phase is free from phase jumps corresponding to the column (or the row) of the two-dimensional phase map;
   generating a first three-dimensional unwrapped phase map by performing a first absolute rotation of the seventh phases corresponding to all columns (or rows) of the two-dimensional phase map; and
   generating a second three-dimensional unwrapped phase map by performing a second absolute rotation of phases obtained corresponding to the seventh phases after application of the first absolute rotation;
   wherein the second three-dimensional unwrapped phase map has a prescribed phase distribution and is free from noise error, shifting error and hole error, wherein the second three-dimensional unwrapped phase map having a prescribed phase distribution that can be inspected at a human vision scale.

2. The method of claim 1 wherein the wrapped phase map is two-dimensional or three-dimensional.

3. The method of claim 1 wherein the phase-shift algorithm is three-frame phase-shift algorithm.

4. The method of claim 1 wherein the phase-shift algorithm is four-frame phase-shift algorithm.

5. The method of claim 1 wherein the phase-shift algorithm is five-frame phase-shift algorithm.

6. The method of claim 1 wherein the phase-shift algorithm is Carré algorithm.

7. The method of claim 1 wherein the noise is residual noise or noise at a lateral surface of height discontinuities or combination thereof.

8. A method for generating an unwrapped phase map, wherein the method comprises:
   generating interferograms of an object image;
   generating a wrapped phase map of the object image from the interferograms by application of a phase-shift algorithm;
   detecting phase jumps and noise in the wrapped phase map;
   considering a first phase jump position, a second phase jump position, a third phase jump position and a fourth phase jump position, corresponding to a one of a column (or a row) of the wrapped phase map;
   classifying a first phase value of a first phase comprising phase values, the noise and holes at the left of the second phase jump position, and classifying a second phase value of a second phase comprising phase values, the noise and holes between the third phase jump position and the fourth phase jump position;
   calculating a first row center from the first phase and a second row center from the second phase;
   interpolating a first phase center of the first row center position based on the first row center position and neighboring integral row pixels;
   interpolating a second phase center of the second row center position based on the second row center position and neighboring integral row pixels;
   generating a third phase by performing a first relative rotation of the first phase around the first phase center by a first angle to preserve the phase values, the noise and holes of the first phase, and
   generating a fourth phase by performing the first relative rotation of the second phase around the second phase center by a second angle to preserve the phase values, the noise and holes of the second phase;
   generating a fifth phase by performing a second relative rotation of the third phase around the first phase center by a third angle without changing a position of the fourth phase;
   generating a resultant phase by shifting the fifth phase and performing stitching in which a sixth phase is generated by stitching the resultant phase and the fourth phase; wherein the sixth phase is free from phase jumps between the first phase jump position and the fourth phase jump position;
   repeating cycles of the first relative rotation, the second relative rotation and the stitching process to obtain a seventh phase corresponding to one of a column (or a row) of the two-dimensional phase map obtained from application of said cycles;

wherein the sixth phase of present said cycle is the first phase of next said cycle;

wherein the seventh phase is free from phase jumps corresponding to the row (or the column) of the two-dimensional phase map;

generating a first three-dimensional unwrapped phase map by performing a first absolute rotation of all the seventh phases corresponding to all the columns (or the rows) of the two-dimensional phase map;

generating a second three-dimensional unwrapped phase map by performing a second absolute rotation of phases obtained corresponding to the seventh phases after application of the first absolute rotation;

wherein the second three-dimensional unwrapped phase map has a prescribed phase distribution and is free from the noise error, the shifting error and the hole error, wherein the second three-dimensional unwrapped phase map having a prescribed phase distribution that can be inspected at a human vision scale; and filtering the noise preserved during the first relative rotation from the second three-dimensional unwrapped phase map by a filter, so as to obtain a noise-removed unwrapped phase map.

9. The method of claim 8 wherein the wrapped phase map is two-dimensional or three-dimensional.

10. The method of claim 8 wherein the phase-shift algorithm is three-frame phase-shift algorithm.

11. The method of claim 8 wherein the phase-shift algorithm is four-frame phase-shift algorithm.

12. The method of claim 8 wherein the phase-shift algorithm is five-frame phase-shift algorithm.

13. The method of claim 8 wherein the phase-shift algorithm is Carré algorithm.

14. The method of claim 8 wherein the noise is the noise is residual noise or noise at a lateral surface of height discontinuities or combination thereof.

* * * * *